J. G. STEELE.
FEED MIXER.
APPLICATION FILED FEB. 7, 1921.
1,429,790.
Patented Sept. 19, 1922.
2 SHEETS—SHEET 2.
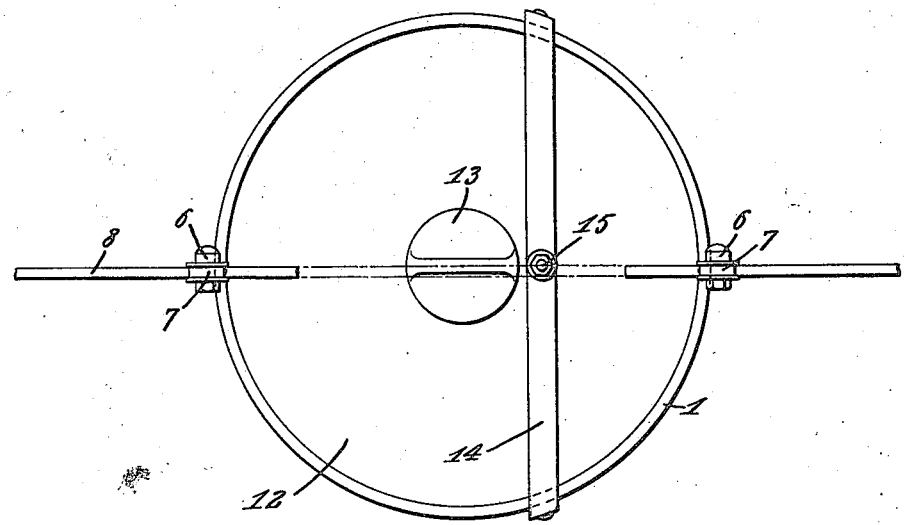
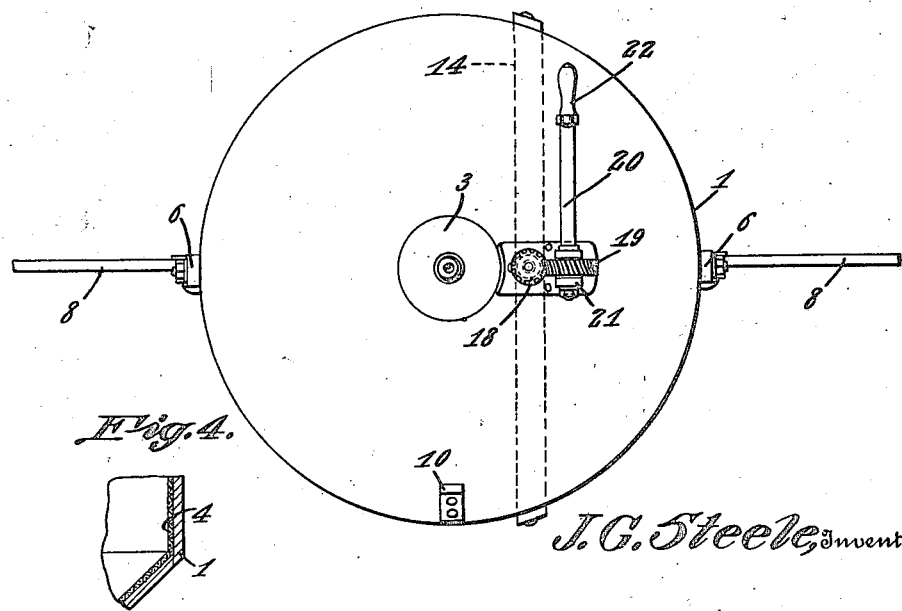
J. G. Steele, Inventor
By Asho & Co.
Attorneys Patented Sept. 19, 1922.

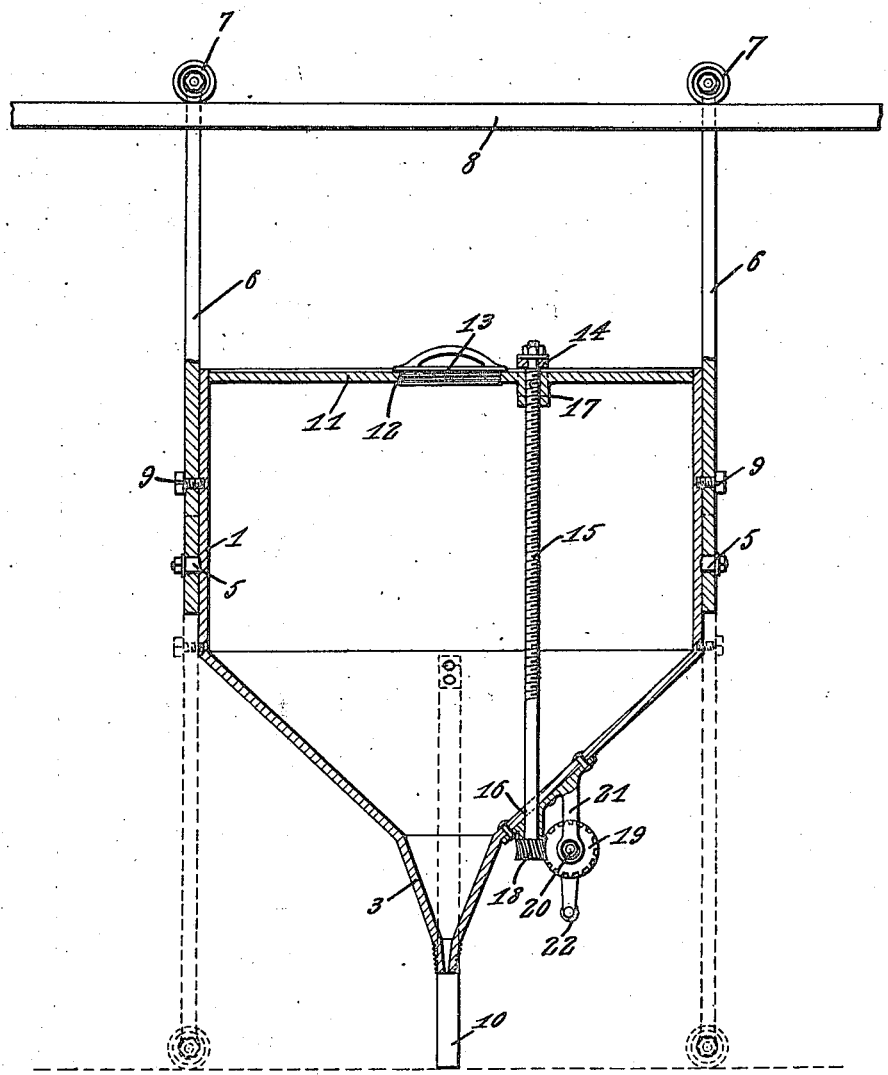

1,429,790

UNITED STATES PATENT OFFICE.

JOHN GALE STEELE, OF AMARILLO, TEXAS.

FEED MIXER.

Application filed February 7, 1921. Serial No. 443,235.

*To all whom it may concern:*

Be it known that I, JOHN G. STEELE, a citizen of the United States, residing at Amarillo, in the county of Potter and State of Texas, have invented a new and useful Feed Mixer, of which the following is a specification.

This invention relates to apparatus for use in mixing molasses with feed to be supplied to live stock, one of the objects of the invention being to provide a portable tank having means working therein for forcibly expelling the molasses through a nozzle from which it can be discharged through a hose onto the feed to be treated.

A still further object is to provide a structure of this character which can be readily moved from place to place and which can be adapted to travel either upon the ground or upon an overhead track.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a vertical section through the device the hangers being shown by dotted lines adjusted to downwardly extended positions so as to support the tank on the ground.

Figure 2 is a plan view.

Figure 3 is a bottom view.

Figure 4 is an enlarged section through a portion of the tank and showing a lining therein.

Referring to the figures by characters of reference 1 designates a tank preferably cylindrical and which can be made of wood or metal, this tank being open at its upper end while its lower end is tapered to a funnel shaped outlet 2 forming a nozzle from which can be extended a flexible hose, not shown. If the tank is made of wood it can be provided with a lining 4 of canvas or other suitable material.

Oppositely extending aligning studs 5 are provided on the wall of the tank 1 and are pivotally engaged by hangers 6 in the free ends of which are mounted wheels 7. These wheels are adapted normally to travel on an overhead track 8 or, under some conditions, can be swung downwardly to the position indicated by dotted lines in Figure 1 so that the wheels will travel along the ground. When the hangers are in either of the positions described they can be fastened by means of screws 9 or similar devices. A support 10 can be used in connection with the tank to prevent it from accidentally tilting while supported by the wheels 7 in contact with the ground.

For the purpose of forcibly ejecting syrup through the nozzle 3 a follower or head 11 is slidably mounted within the open end portion of the tank 1, this head being provided with a filling opening 12 normally closed by a screw cap or plug 13. A cross strip 14 is secured to opposed portions of the wall of the tank and extends across the open end of said tank, this strip having one end of a screw 15 swiveled therein while the other end of the screw is journaled within the tapered bottom of the tank as shown at 16. The threaded portion of the screw engages the wall of an opening 17 in the head 11 so that when the screw is rotated this head will be forced downwardly against the liquid contents of the tank, forcing said contents under pressure through the nozzle 3 and the flexible hose attached thereto.

A worm gear 18 is secured to the lower end of the screw 15 and constantly meshes with a worm gear 19 attached to a short shaft 20 journaled within a depending bracket 21 on the bottom of the tank. A crank 22 is connected to the shaft 20 and by means thereof the gears can be rotated so as to feed the head 11 downwardly or upwardly.

Obviously by mounting the tank for example on the overhead track 8, and then removing the plug 13 from the raised head 11, the tank can be filled with molasses after which the plug 13 can be replaced. The tank can then be moved to position over the feed and by turning the crank 22 molasses contained within the tank can be forcibly ejected through the nozzle 3 and into the flexible hose, thus being sprayed over the feed and becoming thoroughly mixed therewith. Thus it becomes possible for the owners of live stock to prepare their own feed readily and relieve them of the necessity of purchasing in the open market especially prepared mixtures of molasses and feed.

What is claimed is:—

Apparatus of the class described including a tank having an outlet, means for directing the contents of the tank through the outlet, hangers adjustable angularly upon opposed portions of the tank, support engaging wheels connected to the hangers, and means for securing said hangers in either upwardly or downwardly extending positions upon the tank for engagement with an overhead or an underneath support.

In testimony that I claim the foregoing as my own, I have hereto affixed my signature in the presence of two witnesses.

JOHN GALE STEELE.

Witnesses:
R. B. MUSICK,
R. M. BURNS.